United States Patent [19]

Nakane et al.

[11] 4,259,209

[45] Mar. 31, 1981

[54] CATALYST FOR CONCENTRATING HYDROGEN ISOTOPES AND PROCESS FOR PRODUCING A SUPPORT THEREFOR

[75] Inventors: Ryohei Nakane; Shohei Isomura, both of Wako; Koichi Okita, Osaka; Eiji Kamijo, Osaka; Tatsuya Nishimoto, Osaka, all of Japan

[73] Assignees: Rikagaku Kenkyusho, Saitama; Sumitomo Electric Industries, Ltd., Osaka, both of Japan

[21] Appl. No.: 34,838

[22] Filed: Apr. 30, 1979

[30] Foreign Application Priority Data

Apr. 28, 1978 [JP] Japan .................................. 53/52051
Apr. 28, 1978 [JP] Japan .................................. 53/52054

[51] Int. Cl.$^3$ .......................... B01J 31/06; C01B 5/02
[52] U.S. Cl. ................... 252/430; 252/472; 423/580; 423/648 A
[58] Field of Search ............... 252/430, 472; 423/580, 423/648 A

[56] References Cited

U.S. PATENT DOCUMENTS

| | | | |
|---|---|---|---|
| 3,888,974 | 6/1975 | Stevens | 252/430 |
| 3,981,976 | 9/1976 | Stevens | 252/430 |
| 4,025,560 | 5/1977 | Rolston et al. | 423/580 |
| 4,126,667 | 11/1978 | Butler et al. | 423/580 |
| 4,143,123 | 3/1979 | Butler et al. | 423/580 |

*Primary Examiner*—Jacqueline V. Howard
*Attorney, Agent, or Firm*—Sughrue, Rothwell, Mion, Zinn and Macpeak

[57] ABSTRACT

A catalyst for concentrating hydrogen isotopes for use in performing hydrogen isotopes exchange between gaseous hydrogen and liquid water, the catalyst comprising a support of porous polytetrafluoroethylene having a total specific surface area of 2 to 80 m$^2$/g as a result of mixing therewith 0.5 to 15% by weight of fluorocarbon or a porous styrene polymer or styrene/-divinylbenzene copolymer having a specific surface area of at least 150 m$^2$/g, and deposited on the support particles of at least one element selected from Group VIII of the Periodic Table. A method for producing a support of porous polytetrafluoroethylene for such catalyst is also disclosed.

16 Claims, No Drawings

CATALYST FOR CONCENTRATING HYDROGEN ISOTOPES AND PROCESS FOR PRODUCING A SUPPORT THEREFOR

BACKGROUND OF THE INVENTION

1. Field of the Invention

This invention relates to a catalyst suitable for effective exchange of hydrogen isotopes between gaseous hydrogen and liquid water, and to a process for producing a support or carrier for said catalyst.

2. Description of the Prior Art

U.S. Pat. No. 2,690,379 and Japanese Patent Publication No. 869/1959 disclose that an exchange reaction of heavy hydrogen occurs when heavy hydrogen-containing hydrogen is reacted with water with the aid of a catalyst composed of a relatively inert support having deposited thereon particles of at least one of nickel, cobalt, ruthenium, rhodium, palladium and platinum. It is known that in this method, the catalyst induces an exchange reaction of hydrogen isotopes between hydrogen and steam. However, when this catalyst contacts liquid water, a large and unfavorable loss of activity results.

Japanese Patent Publication No. 32800/1976 (corresponding to French Patent No. 2,355,553) discloses a catalyst comprising an inert support and a sealing coating thereon which is water resistant (i.e., impermeable to liquid water) but is permeable to steam and hydrogen gas. Typical examples of the sealing coating include silicone resins, polytetrafluoroethylene, and a perfluoroethylene/propylene copolymer.

U.S. Pat. No. 4,025,560 discloses that instead of conventional inorganic inert supports, polytetrafluoroethylene, polyethylene, polystyrene and polypropylene are preferred as the inert support. The present invention relates to an improvement of the technique disclosed in this U.S. Patent.

SUMMARY OF THE INVENTION

In particular, it is an object of this invention to provide a polytetrafluoroethylene support having properties which are essential to increasing catalytic activity.

It is a secondary object of this invention to provide a process suitable for obtaining a porous polytetrafluoroethylene support having these specified properties.

Example 1 of U.S. Pat. No. 4,025,560 discloses the use of porous polytetrafluoroethylene cubes with one side measuring 3 mm. However, the patent fails to disclose other properties, such as average pore diameter, porosity and outside diameter, which specifically define the porous structure of the polytetrafluoroethylene cubes. Extensive investigations have found that porous polytetrafluoroethylene having specified properties is preferred as a catalyst support.

Thus, the present invention provides a catalyst for concentrating hydrogen isotopes for use in performing hydrogen isotopes exchange between gaseous hydrogen and liquid water, said catalyst comprising a support of porous polytetrafluoroethylene having a total specific area of 2 to 80 $m^2/g$ as a result of mixing therewith 0.5 to 15% by weight of fluorocarbon or a porous styrene polymer or styrene/divinylbenzene copolymer having a specific surface area of at least 150 $m^2/g$, and deposited on said support particles of at least one element selected from Group VIII of the Periodic Table.

DETAILED DESCRIPTION OF THE INVENTION

The term "fluorocarbon" as used herein refers to a white powder obtained by reacting carbon and fluorine gas. When 2 mols of carbon react completely with 1 mol of fluorine gas, 2 mols of fluorocarbon (or "carbon monofluoride") are obtained as a white powder. As the proportion of bonded fluorine decreases, the product changes to gray and then to black. The fluorocarbon product is presently available only in Japan, and is sold by Nippon Carbon Co., Ltd. The property of the fluorocarbon varies according to the degree of crystallization of the starting carbon. Preferably, the starting carbon is amorphous carbon, and specific examples are charcoal and active carbon. When the carbon is reacted completely with fluorine, the product shows an exceedingly high degree of hydrophobicity, but by decreasing the degree of fluorination, the product changes gradually from a hydrophobic to a hydrophilic form. It is a characteristic feature of this invention that a suitable degree of hydrophobicity of the fluorocarbon can be imparted by adjusting the degree of fluorination, and a condition permitting easy deposition of the element of Group VIII of the Periodic Table can be provided.

The porous styrene polymer of styrene/divinylbenzene copolymer has been used in the form of beads packed into a separating column used in liquid or gas chromatography.

Suitable porous styrene polymers include Porapak-P, -Q, -R, -S and -N made by Waters Associate Co., Ltd., U.S.A. Porapak-PS and -QS obtained by treating Porapak-P and -Q with silane to make them hydrophobic, and Shodex S-103, S-104, S-105, A-800 Series, H-200 Series, HD-4, and HD-5 which are products of Showa Denko Co., Ltd., Japan.

Since these polymer beads are uniform and each consists of an aggregation of finer primary particles, they are characterized by a high internal surface area. Generally, the size of the polymer beads can be changed from about 2 microns to about 300 microns depending upon the copolymerization ratio between styrene and divinylbenzene and upon the emulsion-polymerization conditions. The specific surface area of the beads can reach about 1,000 $m^2/g$ at most. The polymer beads can also be used in the form of a derivative resulting from treatment with silane, etc., to render them hydrophobic.

The elements of the Group VIII of the Periodic Table include Fe, Co and Ni, and a nickel-chromium catalyst can also be used. Preferably, they are elements of a higher period in the Periodic Table, namely, Ru, Rh and Pd, more preferably Os, Ir and Pt. Among these, Pt appears to give the best result. No clear theoretical reason can be assigned for this tendency, but it is assumed that during adsorbing and decomposing Pt compounds, Pt deposits in a manner which makes it most active. It is also believed that, possibly, during the reduction of chloroplatinic acid to Pt, it becomes the finest particles.

When the element of Group VIII of the Periodic Table is deposited on the surface of a porous support, it can be deposited in finer particles as the surface area of the support increases, thus affording a catalyst having higher activity. Platinum is especially preferred as the element of Group VIII of the Periodic Table. The concentration of platinum in the catalyst is from about 0.05% by weight to about 5% by weight based on the weight of the catalyst support.

More preferably, the porous support has a porosity within the range of about 50% to about 90%, and is used in the form of rings cut to a suitable length from a tubular product rather than 3 mm cubes. It has been ascertained that the average pore diameter of the porous polytetrafluoroethylene is within the range of about 0.5 micron to about 2 microns, and the porous styrene polymer or styrene/divinylbenzene copolymer will have preferred hydrophobicity and gas permeability when it is treated with a silane.

More preferably, the porous polytetrafluoroethylene has a fibrous structure composed of fibers and nodes in which the nodes are connected to one another by the individual fibrils. Such a fibrous structure can be obtained by mixing polytetrafluoroethylene with a liquid lubricant, molding the mixture into a rod or tube by a paste extrusion process, removing the liquid lubricant, stretching the molded product at a temperature below the melting point of the polytetrafluoroethylene, and heating the stretched product at a temperature above the melting point of the polytetrafluoroethylene while fixing it so as not to allow its free shrinkage. This process will be described below in more detail.

The following detailed description will clarify the reasons as to why the aforesaid properties of the support are especially favorable to the catalyst.

The shape of a catalyst packed into a reaction tower is determined almost solely by the shape of a support for the catalyst. Desirably, a filling material meets the following requirements: (1) it should be as light as possible, (2) it should have the highest possible surface area, and (3) it should reduce the pressure drop of a reaction column. Raschig rings, lessing rings, Berl saddles and Intalox saddles generally used in the chemical industry are devised so as to meet these three requirements, but not perfectly.

It will be readily understood that the tubular molded article of porous polytetrafluoroethylene in this invention has a reduced weight per unit volume as compared with cubes and filling rods, and an increased surface area which contributes to its reactivity, and furthermore, since the tube contains an inner cavity, it permits a decrease in the pressure drop of a gas.

As stated above, the porosity of the polytetrafluoroethylene used in this invention is limited to about 50% to about 90%. If it is less than 45%, the surface area decreases and the weight increases. If it is above 95%, the polytetrafluoroethylene will be deformed during packing in the reactor and finally cause an increase in the pressure drop of a gas.

Regarding the average pore size of about 0.5 micron to about 2 microns, if it is below 0.4 micron, the surface area decreases. If it is above 3 microns the hydrophobicity of the support with respect to liquid water is reduced, and in long-term use, liquid water will be accumulated also in the inside of the pores. It will be understood from the foregoing that the properties defined by the present invention are especially preferred as a support for catalyst.

During reduction of Pt compounds to Pt element, the higher the surface area of porous support tends to increase, the larger the number of the resulting fine particles.

With a porous support of pure polytetrafluoroethylene containing no additive, the surface area which it can attain is limited even if its porosity is increased. When 0.5 to 15% by weight of a porous styrene polymer or styrene/divinylbenzene copolymer having a specific surface area of about 150 m$^2$/g to about 1,000 m$^2$/g or a fluorocarbon having a specific surface area of about 150 m$^2$/g to about 400 m$^2$/g is mixed with polytetrafluoroethylene, the specific surface area increases proportional to the amount mixed, and consequently, powderization of the Group VIII element into fine particles is promoted during the reduction of the Group VIII compound to the Group VIII metal, and the reaction rate constant of the catalyst increases. With fluorocarbon obtained from graphite which is crystalline carbon, no appreciable increase in the reaction rate constant of the catalyst is noted in spite of the increased specific surface area of the resulting porous support. On the other hand, with fluorocarbon obtained from charcoal or active carbon which is amorphous carbon, an increase in the reaction rate constant of the catalyst is noted despite the fact that the specific surface area of the resulting porous support somewhat decreases as a result of fluorination. It has been found therefore that the characteristics of the fluorocarbon are not determined solely by its specific surface area alone, and its crystal structure (crystalline or amorphous) affects the characteristics of the catalyst.

The concentration of the element of Group VIII of the Periodic Table such as platinum may be from about 0.01% by weight to about 10% by weight, but preferably, it is from about 0.05% weight to about 5% by weight. Too low concentrations mean a decreased number of active sites. If the concentration is too high, the deposited particles of the element agglomerate unless the specific surface area of the porous support is very high. Thus, the number of active sites does not increase despite the large amount of the element which is used. In regard to the concentration of the element such as platinum, it is important to use a support according to the present invention. When the amount of platinum is the same, the deposited particles are finer with the invention support in comparison to a support not containing fluorocarbon, etc., and thus, the resulting catalyst exhibits a higher reaction rate than a catalyst carried on the latter support not containing fluorocarbon, etc.

By molding the support into a tubular form, its weight can be decreased as compared with a rod-like or cubic support having the same volume. Since the support used in this invention also has a porosity of 50% to 90%, it can be effectively made light in weight. Thus, the amount of platinum used for the same volume of support can be drastically reduced as compared with conventional supports such as alumina, silica, magnesia and active carbon, and an economically advantageous catalyst can be obtained.

Porous polytetrafluoroethylene having the properties defined in the present invention cannot be obtained by directly using a suspension of polytetrafluoroethylene as disclosed in French Pat. No. 2,355,553.

Porous polytetrafluoroethylene having the above properties can be obtained for the first time when it has a fibrous structure characterized by nodes interconnected by fibrils. Such a structure can be produced by mixing the aforesaid suspension of polytetrafluoroethylene with fluorocarbon or a porous powder of a styrene polymer or styrene/divinylbenzene copolymer and forming the mixture into a fine solid powder (or forming the suspension directly into a fine solid powder and then mixing it with the fluorocarbon or the porous styrene polymer or styrene/divinylbenzene copolymer), adding a liquid lubricant to the aforesaid mixture, and molding the mixture into a rod or tube by a socalled paste processing method, followed by removing the liquid lubricant.

Removal of the lubricant results in the formation of fine spaces at the parts previously occupied by the liquid lubricant. By stretching the tube in the longitudinal direction, new larger spaces are formed by growing the fine spaces as nuclei. The size, number, etc., of the resulting spaces can be changed by varying the stretching conditions, and, for example, products having an average pore diameter of 0.5 micron and a porosity of 20%, 50%, and 70%, respectively, can be provided. The porosity is directly related to the size and number of the spaces. Products having an average pore diameter of 2 microns and a porosity of 40%, 60% and 90% and even 96%, respectively, can be obtained.

By heating the stretched product to a temperature above the melting point while preventing its shrinkage, the porous fiber structure can be set.

Various methods have been disclosed for the production of porous polytetrafluoroethylene. It would seem very difficult, however, to control the pore diameter distribution and to increase the porosity to at least 50%, especially to 90%, unless the method described in the present invention is used.

Some embodiments described, for example, in U.S. Pat. No. 2,690,379 are possible as an exchange column in which to effect exchange reaction of hydrogen isotopes. For example, there can be used a multiplicity of units stacked each unit consisting of a tank packed with the catalyst, in which the exchange reaction occurs between gaseous hydrogen and saturated moisture, and a packed column, in which the exchange reaction occurs between saturated moisture and liquid water. A method is also possible in which the catalyst is packed into a reaction column, and hydrogen gas and liquid water are passed concurrently or countercurrently therethrough. Any of such methods include a step of recovering hydrogen isotopes in a more concentrated form than in the supplied water.

The following Examples and Comparative Examples are given to facilitate the understanding of the present invention.

COMPARATIVE EXAMPLE 1

A porous polytetrafluoroethylene tube having an outside diameter of 5.0 mm, an inside diameter of 4.0 mm, an average pore diameter of 1.2 microns and a porosity of 74% was produced by the following procedure, and cut into pieces with a length of 5 mm for use as a carrier for a catalyst.

3 kg of PTFE Fine Powder F-103 (a product of Daikin Kogyo Co., Ltd.) was mixed uniformly with 0.75 kg of Super V. M. & P. Naphtha (a product of Shell Chemical Co.). The mixture was extruded into a tube having an outside diameter of 5.5 mm and an inside diameter of 4.2 mm at a reduction ratio of 680, and passed through an oven at 200° to 250° C. to remove the Naphtha. Then, the tube was stretched at a feed rate of 40 cm/min at an oven temperature of 300° to 320° C. to 4 times its original length in the longitudinal direction. The resulting tube had the properties described above.

1 kg of the 5 mm-long carriers were dipped in a solution of chloroplantinic acid in acetone, and while heating the dipped carriers at 70° C., the pressure was reduced to 3 Torr to evaporate the acetone. At this time, control was exercised such that the amount of platinum after reduction would become 0.5%. Then, the chloroplatinic acid was reduced to black particles of platinum in a hydrogen atmosphere at 200° C. to form 4.8 liters of a catalyst.

The catalyst was packed uniformly to a height of 28.5 cm into a glass column having a cross sectional area of 2.27 cm$^2$, and the entire column was kept at 30° C.

Through the catalyst bed, hydrogen gas was passed upwardly at a rate of 1.37 liters/min and liquid water was passed downwardly at a rate of 10 ml/min so as to contact the catalyst with the flow of purified hydrogen gas having a natural isotope content (D/H=0.0001) and the flow of liquid water having a high concentration of heavy hydrogen (D/H=0.12072). After passage of these flows through the column, the heavy hydrogen isotope content of the hydrogen flow and the liquid water flow was periodically checked, and the degree of isotope transfer between the two flows was measured. From the measured values, H.E.T.P., i.e., the height equivalent to theoretical plate, and the reaction rate constant can be determined.

Typical values obtained are shown in Table 1.

TABLE 1

| | D Concentration | | | |
|---|---|---|---|---|
| Time (min) | Hydrogen at the Top of Column | Water at the Bottom of Column | H.E.T.P. (m) | Reaction Rate Constant (mol/hr . m$^3$) |
|---|---|---|---|---|
| 3 | 0.02405 | 0.10057 | 0.48 | 1.50 × 10$^4$ |
| 5 | 0.01798 | 0.10302 | 0.60 | 1.20 × 10$^4$ |
| 10 | 0.01592 | 0.10506 | 0.73 | 0.99 × 10$^4$ |
| 20 | 0.01520 | 0.10577 | 0.78 | 0.92 × 10$^4$ |
| 30 | 0.01435 | 0.10661 | 0.85 | 0.85 × 10$^4$ |
| 60 | 0.01836 | 0.10264 | 0.58 | 1.24 × 10$^4$ |
| 120 | 0.01615 | 0.10483 | 0.71 | 1.01 × 10$^4$ |
| 180 | 0.01346 | 0.10749 | 0.93 | 0.77 × 10$^4$ |
| 240 | 0.01467 | 0.10630 | 0.82 | 0.88 × 10$^4$ |
| 300 | 0.01528 | 0.10569 | 0.77 | 0.93 × 10$^4$ |

EXAMPLE 1

To 1 kg of PTFE Fine Powder F-104 (a product of Daikin Kogyo co., Ltd.) was added 1.5% by weight of each of the porous styrene polymers shown in Table 2, and the mixture was uniformly mixed with 0.23 kg of a lubricant (DOSB). The mixture was extruded into a rod having an outside diameter of 4.0 mm at a reduction ratio of 85. The lubricant was removed, and the rod was fed into an electric oven at 300° C. at a flow rate of 45 cm/min, and wound up at a speed three times as fast as the feed rate. The rod was then fed into an electric oven at 500° C. at a rate of 28 cm/min to sinter the entire rod.

the porous rod was cut, platinum was deposited, and the reacton rate constant was determined by the same procedures as in Comparative Example 1. The height of the reaction column was changed between 10 cm and 30 cm, and the operation was performed continuously for 10 hours. The results are shown in Table 2.

TABLE 2

| Run No. | Characteristics of Styrene Polymer | | | Characteristics of Support | | | Reaction Rate Constant (mol/hr · m³) |
|---|---|---|---|---|---|---|---|
| | Type | Particle Diameter (mesh) | Specific Surface Area (m²/g) | Specific Surface Area (μ) | Average Particle Diameter (μ) | Porosity (%) | |
| 1 | Porapak-P | 80–100 | 155 | 8.2 | 0.8 | 63 | $1.6 \times 10^4$ |
| 2 | Porapak-PS | 80–100 | 150 | 8.1 | 0.8 | 64 | $1.9 \times 10^4$ |
| 3 | Porapak-Q | 80–100 | 630 | 14.2 | 0.8 | 68 | $1.7 \times 10^4$ |
| 4 | Porapak-QS | 80–100 | 610 | 13.5 | 0.8 | 67 | $2.2 \times 10^4$ |
| 5 | Shodex S104 | 100–150 | 660 | 12.9 | 0.8 | 69 | $2.4 \times 10^4$ |
| 6 | Shodex S105 | 80–100 | 620 | 13.5 | 0.8 | 68 | $1.9 \times 10^4$ |
| 7 | Shodex HD-4 | 60–80 | 650 | 18.7 | 1.0 | 65 | $1.8 \times 10^4$ |
| 8 | Shodex HD-5 | 40–60 | 380 | 12.2 | 1.2 | 60 | $1.7 \times 10^4$ |
| 9 | — | — | — | 1.2 | 0.6 | 75 | $0.65 \times 10^4$ |

EXAMPLE 2

Shodex S104 was mixed in an amount of 0.2, 3, 5, and 10% by weight, respectively, with polytetrafluoroethylene. Each of the mixtures was molded into a tube having an outside diameter of 5.5 mm and an inside diameter of 4.0 mm, and stretched in the same manner as in Example 1. The tube was sintered in an electric oven at 480° to 550° C. The resulting tube was cut into pieces with a length of 5 mm, and platinum was added in the same manner as in Comparative Example 1.

The properties of the resulting supports are shown in Table 3.

TABLE 3

| Run No. | Amount of Shodex Added (wt%) | Characteristics of Support | | | Reaction Rate Constant (mol/hr · m³) |
|---|---|---|---|---|---|
| | | Short Axis Diameter (mm) | Average Pore Diameter (μ) | Porosity (%) | |
| 10 | 0.2 | 3.8 | 0.6 | 65 | $8.5 \times 10^3$ |
| 11 | 0.2 | 2.0 | 0.6 | 51 | $16.5 \times 10^3$ |
| 12 | 3 | 2.0 | 1.8 | 60 | $29.2 \times 10^3$ |
| 13 | 5 | 3.8 | 1.9 | 62 | $20.2 \times 10^3$ |
| 14 | 10 | 3.8 | 2.1 | 68 | $14.5 \times 10^3$ |

COMPARATIVE EXAMPLE 2

About 40% of ammonium chloride powder having a particle diameter of about 50 microns was mixed with polytetrafluoroethylene with which the kerosene used in Comparative Example 1 had been added. The mixture was extruded into a string-like article, and then the kerosene was removed. When the product was sintered at a temperature of more than 327° C., ammonia gas was generated and the product became a foamed structure. When the foamed structure was dipped in water, the unreacted material was removed, and a porous product having a porosity of about 50% was obtained. The product had a pore diameter of from 20 microns to 200 microns. Onto the porous support was deposited 0.5% by weight of platinum black, and the catalyst obtained was packed into the column used in Comparative Example 1. The reaction rate constant was $2 \times 10^3$ (mol/hr·m³), and after 10 days' continuous operation, decreased to $0.5 \times 10^3$ (mol/hr·m³).

EXAMPLE 3

Each of various fluorocarbons produced from the carbonaceous materials shown in Table 4 was added in an amount of 2.5% by weight to 2 kg of PTFE Fine Powder F-104 (a product of Daikin Kogyo Co., Ltd.), and the mixture was uniformly mixed with 0.5 kg of a lubricant (DOSB). The mixture was extruded into a rod having an outside diameter of 5.5 mm at a reduction ratio of 160. The lubricant was removed and the product was continuously fed into an electric oven at 300° C. at a feed rate of 25 cm/min, and wound up at a speed 4 times as fast as the feed speed. The product was then fed into an electric oven at 500° C. at a rate of 25 cm/min to sinter it. The product was cut, platinum was deposited, and the reaction rate constant was determined in the same manner as in Comparative Example 1. The height of the column was between 10 cm and 30 cm, and the reaction rate constant was determined after 10 hours' operation. The results are shown in Table 4.

TABLE 4

| Run No. | Characteristics of Starting Carbon for the Fluorocarbon | | | Characteristics of Fluorocarbon | | Characteristics of Catalyst | |
|---|---|---|---|---|---|---|---|
| | Type | Specific Gravity | Specific Surface Area (m²/g) | C:F Mol Ratio | Specific Surface Area (m²/g) | Specific Surface Area (m²/g) | Reaction Rate Constant (mol/hr · m³) |
| 15 | Natural Graphite | 2.26 | — | 1:0.97 | 190 | 6.9 | $6.5 \times 10^3$ |
| 16 | Petroleum Coke | 2.08 | 3.8 | 1:0.98 | 290 | 10.3 | $8.5 \times 10^3$ |
| 17 | Carbon Black | 1.88 | 36 | 1:0.97 | 300 | 12.4 | $16 \times 10^3$ |
| 18 | Charcoal | 1.68 | 225 | 1:0.91 | 170 | 7.2 | $29 \times 10^3$ |
| 19 | Graphite Fibers | 1.67 | 1.5 | 1:0.96 | 345 | 15.4 | $7.8 \times 10^3$ |
| 20 | Caking Coal | 1.64 | 72 | 1:0.92 | 180 | 6.0 | $25.5 \times 10^3$ |
| 21 | — | — | — | — | — | 1.31 | $6.0 \times 10^3$ |

Natural graphite and graphite fibers did not show much effect, but fluorocarbons produced from carbon black, charcoal and caking coal greatly improved the characteristics of the resulting catalysts.

EXAMPLE 4

Fluorocarbon produced from natural graphite was mixed in an amount of 5, 7 and 10% by weight with polytetrafluoroethylene. Each of the mixtures was molded into a tube having an outside diameter of 5.5 mm and an inside diameter of 4.0 mm, and stretched in the same manner as in Example 1. The tube after leaving an electric oven at 480° C. was cooled to below 327° C. (its crystal melting point). The tube was cut into pieces having a length of 5 mm, and platinum element was deposited in the same manner as in Comparative Example 1.

The properties of the supports and the resulting catalysts were determined, and the results are shown in Table 5.

TABLE 5

| Run No. | Characteristics of Support | | | | Reaction Rate Constant (mol/hr . m$^3$) |
|---|---|---|---|---|---|
| | Amount of Fluorocarbon Added (wt %) | Specific Surface Area (m$^2$/g) | Average Particle Diameter ($\mu$) | Porosity (%) | |
| 22 | 5 | 13.6 | 0.8 | 81 | 10.8 × 10$^3$ |
| 23 | 7 | 15.5 | 1.0 | 79 | 14.5 × 10$^3$ |
| 24 | 10 | 17.8 | 1.5 | 84 | 18.3 × 10$^3$ |
| 25 | 0 | 14 | 0.8 | 80 | 8.5 × 10$^3$ |

COMPARATIVE EXAMPLE 3

3.7%, as solids content, of polytetrafluoroethylene from an aqueous emulsion containing 56% of poly(methyl methacrylate), 35% of butyl cyclohexyl naphthalene and 55% of polytetrafluoroethylene solid were uniformly mixed with 5.3% of active carbon having deposited thereon 1.5% of platinum black by the reduction of chloroplatinic acid. The mixture was dehydrated. The mixture was extruded through a single screw T-die extruder at 160° C. to 180° C. into a product having a large width and a thickness of 2.5 mm. The product was cut into squares with each side measuring 5 mm, and extracted with acetone in a Soxhlet extractor. Thus, porous cubes consisting of active carbon and polytetrafluoroethylene were obtained. The porous cubes as catalyst were packed into the same column as used in Comparative Example 1, and evaluated. The reaction rate constant k was 3×10$^3$ after a lapse of 1 hour, but decreased to 3×10$^1$ after a lapse of 24 hours. The porous cubes had a porosity of 90% and a pore diameter within the range of 10 microns to 100 microns, showing too broad a pore size range.

COMPARATIVE EXAMPLE 4

30% of calcium carbonate having a particle diameter of about 30 microns was mixed with polytetrafluoroethylene with which the same kerosene as used in Comparative Example 1 had been mixed. The mixture was extruded into a string-like article, and rolled in the longitudinal direction by means of a calender roll. Such rolled thin films were stacked, and again rolled in a direction at right angles to the original rolling direction. Such rolled products were again stacked and rolled in the perpendicular direction. This procedure was repeated several times, and then the kerosene was removed by heating. The product was then heated at 380° C. for 20 minutes while fixing it in position. When the product was placed in hydrochloric acid, calcium carbonate was removed. The resulting porous product had a porosity of 35%, but an average pore diameter of 3 to 10 microns. Platinum black was deposited in a concentration of 0.5% by weight on the porous product. The resulting catalyst was evaluated in the same column as used in Comparative Example 1. The reaction rate constant was 5×10$^3$, and decreased to 3×10$^3$ after continuous operation for 10 days.

While the invention has been described in detail and with reference to specific embodiments thereof, it will be apparent to one skilled in the art that various changes and modifications can be made therein without departing from the spirit and scope thereof.

What is claimed is:

1. A catalyst for concentrating hydrogen isotopes for use in performing hydrogen isotope exchange between gaseous hydrogen and liquid water, said catalyst comprising a support of porous polytetrafluoroethylene having a total specific surface area of 2 to 80 m$^2$/g as a result of mixing therewith 0.5 to 15% by weight of a member selected from the group consisting of fluorocarbon, a porous styrene polymer and a porous styrene/divinylbenzene copolymer having a specific surface area of at least 150 m$^2$/g, and, deposited on said support, particles of at least one element selected from the group consisting of elements of Group VIII of the Periodic Table.

2. The catalyst of claim 1, wherein the fluorocarbon is the fluoride of amorphous carbon.

3. The catalyst of claim 1, wherein the porous styrene polymer or styrene/divinylbenzene copolymer is rendered hydrophobic.

4. The catalyst of claims 1, 2 or 3, wherein the porous polytetrafluoroethylene has a porosity of from about 50 to about 90%.

5. The catalyst of claims 1, 2 or 3, wherein the porous polytetrafluoroethylene is in the form of rings cut from a tube thereof.

6. The catalyst of claims 1, 2 or 3, wherein the porous polytetrafluoroethylene has an average pore diameter of from about 0.5 to about 2 microns.

7. The catalyst of claims 1 or 2, wherein the porous polytetrafluoroethylene has a fibrous structure characterized by nodes interconnected by fibrils, said fluorocarbon or said porous styrene polymer or styrene/divinylbenzene copolymer being surrounded by said fibrils, or fixed to said nodes.

8. The catalyst of claims 1, 2 or 3, wherein said at least one Group VIII element is present in an amount of about 0.01% to about 10% by weight.

9. The catalyst of claim 8, wherein said at least one Group VIII element is present in an amount of from about 0.05% to about 5% by weight.

10. The catalyst of claims 1, 2 or 3, wherein said at least one Group VIII element is Ru, Rh or Pd.

11. The catalyst of claims 1, 2 or 3, wherein said at least one Group VIII element is Os, Ir or Pt.

12. The catalyst of claim 11, wherein said at least one Group VIII element is Pt.

13. The catalyst of claim 2, wherein said fluorocarbon has a porosity of about 150 m$^2$/g to about 400 m$^2$/g.

14. the catalyst of claim 3, wherein said porous styrene polymer or said porous styrene/divinylbenzene polymer has a surface area of about 150 m$^2$/g to about 1,000 m$^2$/g.

15. The catalyst of claim 1, wherein said fluorocarbon has a fluorination degree of about 30 to about 100%.

16. The catalyst of claim 1, wherein said catalyst is prepared by extrusion-molding a mixture of a fine powder of (i) polytetrafluoroethylene, (ii) fluorocarbon or a porous styrene polymer or a porous styrene/divinylbenzene copolymer, and (iii) a liquid lubricant into a tube or rod by a paste-extrusion procedure, removing the liquid lubricant from the resulting product, stretching the resulting product at a temperature below the melting point of the polytetrafluoroethylene, heating the stretched product at a temperature above the melting point of the polytetrafluoroethylene while fixing the product so as to prevent free shrinkage, cutting the product to a suitable length to produce a catalyst support and depositing on said support particles of at least one element selected from the group consisting of elements of Group VIII of the Perioic Table.

* * * * *